(12) United States Patent
Hooker et al.

(10) Patent No.: US 9,752,663 B2
(45) Date of Patent: Sep. 5, 2017

(54) COMBINED LINEAR BEARING AND LIFTING ACTUATOR FOR SMELTING ASSEMBLY

(71) Applicant: Schaeffler Technologies GmbH & Co. KG, Herzogenaurach (DE)

(72) Inventors: Craig Hooker, Huntersville, NC (US); Carl White, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 226 days.

(21) Appl. No.: 14/573,449

(22) Filed: Dec. 17, 2014

(65) Prior Publication Data
US 2016/0178039 A1    Jun. 23, 2016

(51) Int. Cl.
| | | |
|---|---|---|
| F16H 25/22 | (2006.01) | |
| F27B 14/08 | (2006.01) | |
| F16H 25/00 | (2006.01) | |
| F27B 14/06 | (2006.01) | |
| C21B 13/00 | (2006.01) | |
| F27B 1/08 | (2006.01) | |
| F27B 1/10 | (2006.01) | |
| F27D 11/10 | (2006.01) | |
| F16H 25/20 | (2006.01) | |

(52) U.S. Cl.
CPC ......... *F16H 25/2252* (2013.01); *C21B 13/00* (2013.01); *F27B 1/08* (2013.01); *F27B 1/10* (2013.01); *F27D 11/10* (2013.01); *F16H 2025/204* (2013.01); *F16H 2025/2075* (2013.01)

(58) Field of Classification Search
CPC ............... C21B 13/00; F16H 2025/204; F16H 2025/2075; F16H 25/2252; F27B 1/08; F27B 1/10; F27D 11/10
USPC ............. 205/392; 204/245, 243.1, 244, 242; 74/89.33, 89.32; 266/171
See application file for complete search history.

(56) References Cited

U.S. PATENT DOCUMENTS

| | | | | |
|---|---|---|---|---|
| 4,465,578 A | * | 8/1984 | Duclaux | C25C 3/10 204/225 |
| 4,617,672 A | * | 10/1986 | Enkner | C21O 5/5211 373/73 |
| 6,783,656 B2 | * | 8/2004 | De Nora | C25C 3/08 204/244 |
| 9,039,566 B2 | * | 5/2015 | Rudy | F16H 1/28 475/226 |
| 2013/0143711 A1 | | 6/2013 | Rudy | |

* cited by examiner

*Primary Examiner* — Scott Kastler
*Assistant Examiner* — Michael Aboagye
(74) *Attorney, Agent, or Firm* — Volpe and Koenig, P.C.

(57) ABSTRACT

An assembly for a smelting process including a lifting actuator for adjusting a height of an anode with respect to a smelting pot is provided. The lifting actuator includes a body supported adjacent to the smelting pot. A motor is connected to a drive screw located in the body and the motor rotates the drive screw. A floating nut is connected to the drive screw, and a carriage plate rests on the floating nut. At least one linear bearing rail is supported on the body and guides the carriage plate. The anode is mounted on the carriage plate such that the motor drives the floating nut axially within the body to adjust a height of the anode with respect to the smelting pot.

6 Claims, 6 Drawing Sheets

COMBINED LINEAR BEARING AND LIFTING ACTUATOR FOR SMELTING ASSEMBLY

FIELD OF INVENTION

The present invention relates a smelting assembly, and is more particularly related to an adjustment assembly for an anode in a smelting assembly.

BACKGROUND

Smelting processes are used to produce metal from ore. Smelting uses heat and a chemical reducing agent to reduce the ore and remove extraneous materials, such as oxygen, to produce a pure metal product. One known smelting process is used to produce aluminum. Aluminum smelting requires large blocks of carbon anodes, typically weighing thousands of pounds, to be partially submerged in an electrolyte bath, such as cryolite, in a carbon-lined pot. A significant amount of current is applied to the anodes, causing the anodes to react with the carbon-lined pot, cryolite bath, and raw alumina to produce the pure molten aluminum product. Typically, a bank of anodes, consisting of roughly 20-40 anodes, is provided on either side of the pot. The anodes dissolve during the aluminum formation process, which requires constant adjustment of the bank of anodes with respect to the cryolite bath. Known systems for adjusting the height of the anode bank requires the entire anode bank to be adjusted at once. This is problematic because individual anodes within a single bank do not necessarily dissolve at the same rate, resulting in uneven submersion of the anodes in the cryolite bath. Other known systems for adjusting the height of the anodes include individual adjusters that require a user to un-clamp and re-clamp each individual anode during adjustments. This requires significant time and effort, considering a typical smelting assembly includes roughly 400-700 pots and roughly 20-40 anodes per pot.

It would be desirable to provide an improved system for adjusting the height of anodes in a smelting assembly.

SUMMARY

A smelting assembly including a lifting actuator assembly for adjusting the height of an anode or a plurality of anodes is provided. The smelting assembly includes a hopper adapted to contain raw smelting material. A pot is provided that includes an opening in connection with the hopper, and the pot contains a solvent and has a coated inner surface. At least one anode includes a first end supported outside the pot and a second end partially submerged in the solvent in the pot. An electrical conductor contacts the first end of the at least one anode. A lifting actuator assembly is provided having a body supported adjacent to the pot. A motor is connected to a drive screw located in the body and the motor rotates the drive screw. A floating nut is connected to the drive screw. A carriage plate rests on the floating nut. At least one linear bearing rail is supported on the body and guides the carriage plate, preferably in a generally vertical direction. The at least one anode is mounted on the carriage plate such that the motor drives the floating nut axially within the body to adjust a height of the at least one anode with respect to the pot.

Additional embodiments are described below and in the claims.

BRIEF DESCRIPTION OF THE DRAWINGS

The foregoing Summary and the following detailed description will be better understood when read in conjunction with the appended drawings, which illustrates a preferred embodiment of the invention. In the drawings.

DETAILED DESCRIPTION OF THE PREFERRED EMBODIMENTS

Figure 1:
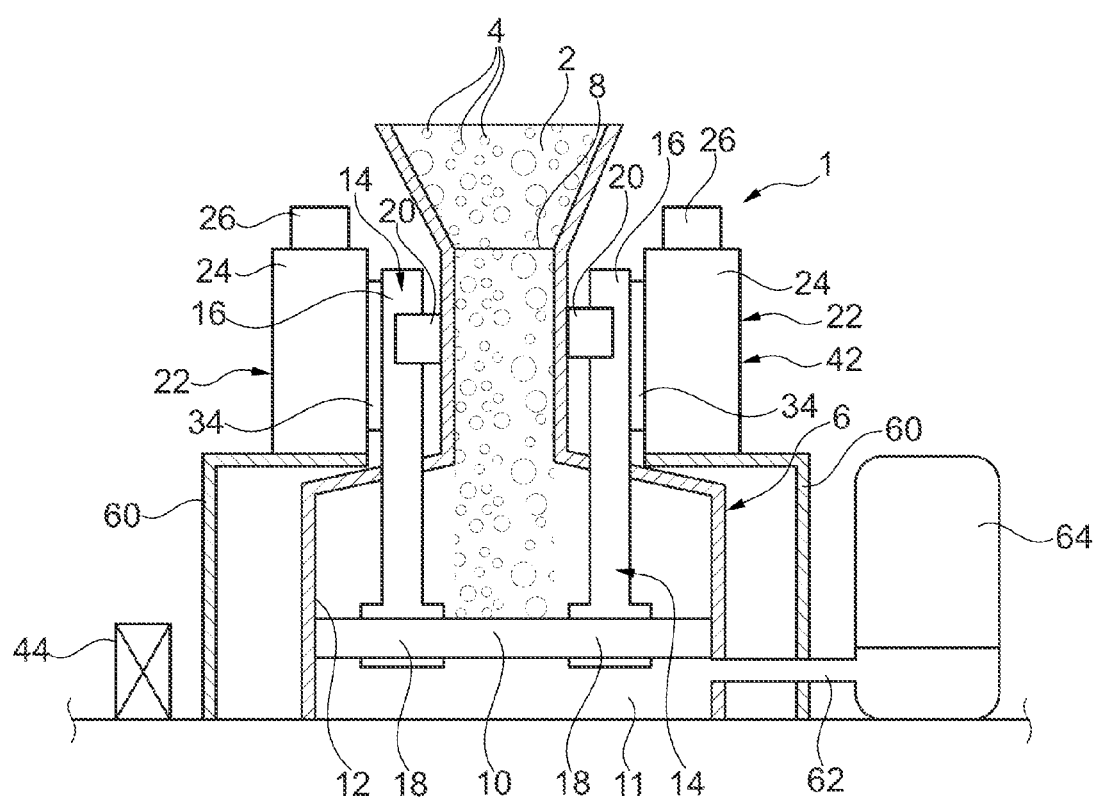
FIG. 1 shows a side cross-sectional view of a smelting assembly including a lifting actuator assembly according to a first embodiment.

Certain terminology is used in the following description for convenience only and is not limiting. The words "front," "rear," "upper," and "lower" designate directions in the drawings to which reference is made. The words "inwardly" and "outwardly" refer to directions toward and away from the parts referenced in the drawings. "Axially" refers to a direction along the axis of a shaft or drive screw. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

An assembly 1 for a smelting process including a lifting actuator assembly 22 is shown in FIG. 1. The assembly 1 includes a hopper 2 adapted to receive and hold raw smelting material 4. A pot 6 including an opening 8 in connection with the hopper 2 is also provided. The pot 6 contains a solvent 10, preferably cryolite, and has a coated inner surface 12, preferably including carbon. At least one anode 14 includes a first end 16 supported outside the pot 6 and a second end 18 partially submerged in the solvent 10 in the pot 6. As shown in FIG. 1, anodes 14 are preferably supported on either side of the pot 6. An electrical conductor 20 contacts the first end 16 of the at least one anode 14. The electrical conductor 20 provides current to the at least one anode 14 to drive the smelting operation. The pot 6 is connected to a syphon 62 which directs molten smelting material 11 to a crucible 64.

Figure 2:
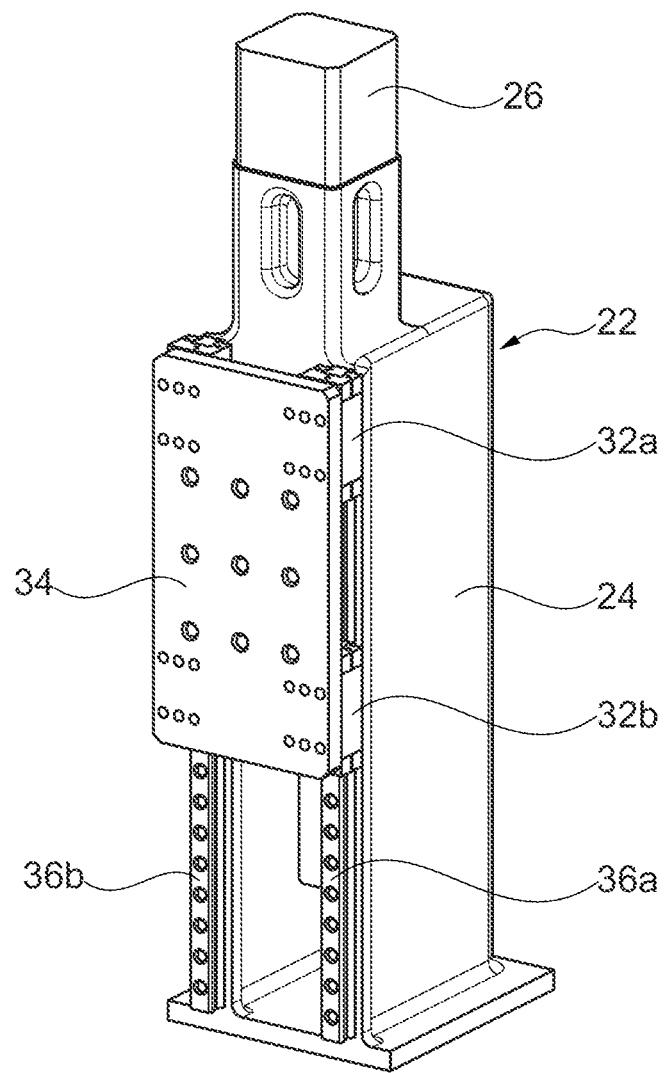
FIG. 2 shows a perspective view of the lifting actuator assembly of FIG. 1.
Figure 3:
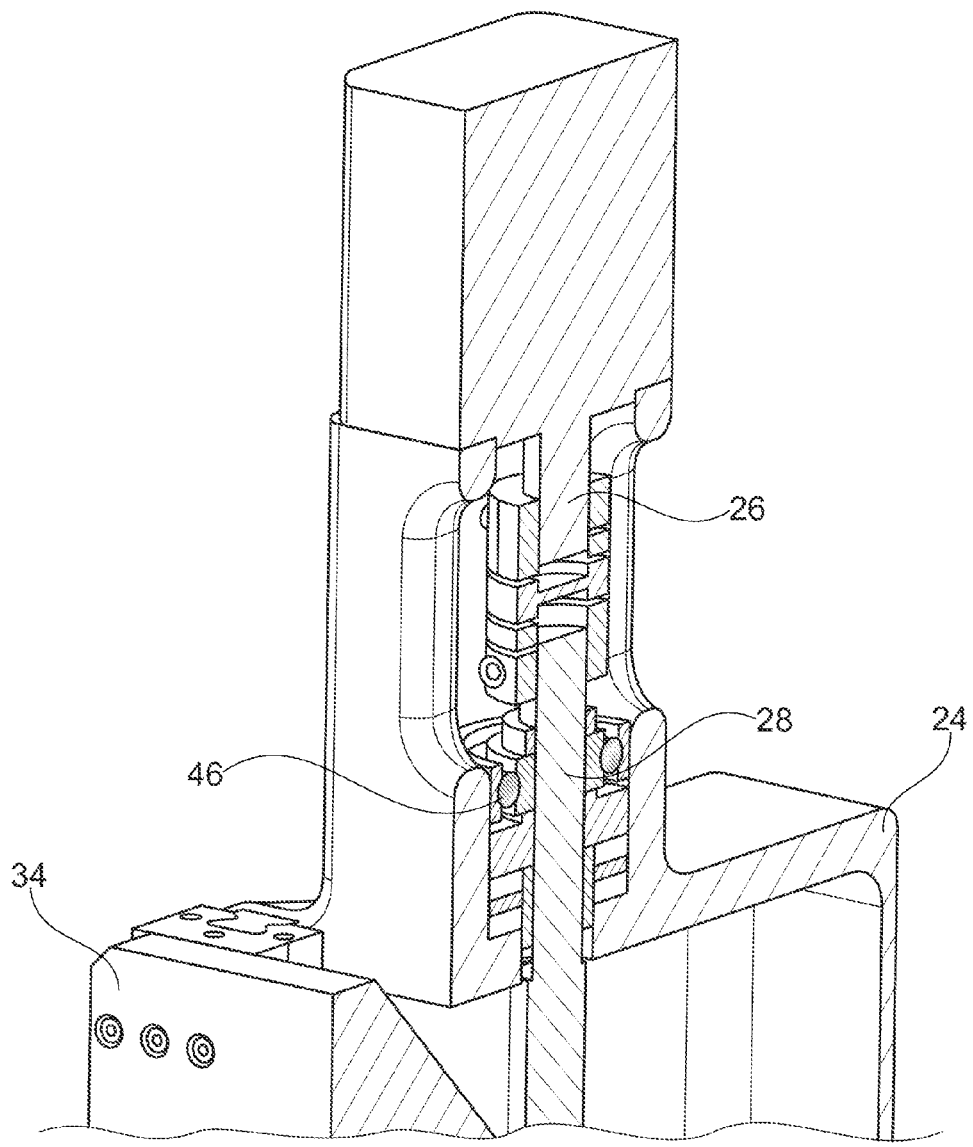
FIG. 3 shows a cutaway view of a top portion of the lifting actuator assembly of FIG. 2.

A lifting actuator assembly 22, shown in FIGS. 1 and 2, is provided to adjust a height of the anode 14 with respect to the pot 6. The lifting actuator assembly 22 includes a body 24 supported adjacent to the pot 6. The lifting actuator assembly 22 can be supported on a cantilevered mount 60 arranged over the pot 6, or a frame arranged around the pot 6. One of ordinary skill in the art would recognize there are various ways to mount the lifting actuator assembly 22 with respect to the pot 6. As shown in FIG. 3, a motor 26 is connected to a drive screw 28 located in the body 24. The motor 26 rotates the drive screw 28, and a floating nut 30 is connected to the drive screw 28. The drive screw 28 drives the floating nut 30. As shown in FIG. 3, the body 24 preferably includes a support bearing 46 for the drive screw 28. In one embodiment, the drive screw 28 can include a differential roller screw. The differential roller screw can include a plurality of planets, each having a varying outer diameter, which provides an increased mechanical advantage and reduction in torque between the drive screw 28 and the floating nut 30. The differential roller screw also eliminates the need for a gear box, which requires additional components and installation space compared to a differential roller screw. For example, one possible arrangement is shown in U.S. Patent Pub. 2013/0143711 A1. One of ordinary skill in the art would recognize that other arrangements of differential roller screws could also be used.

Figure 4:
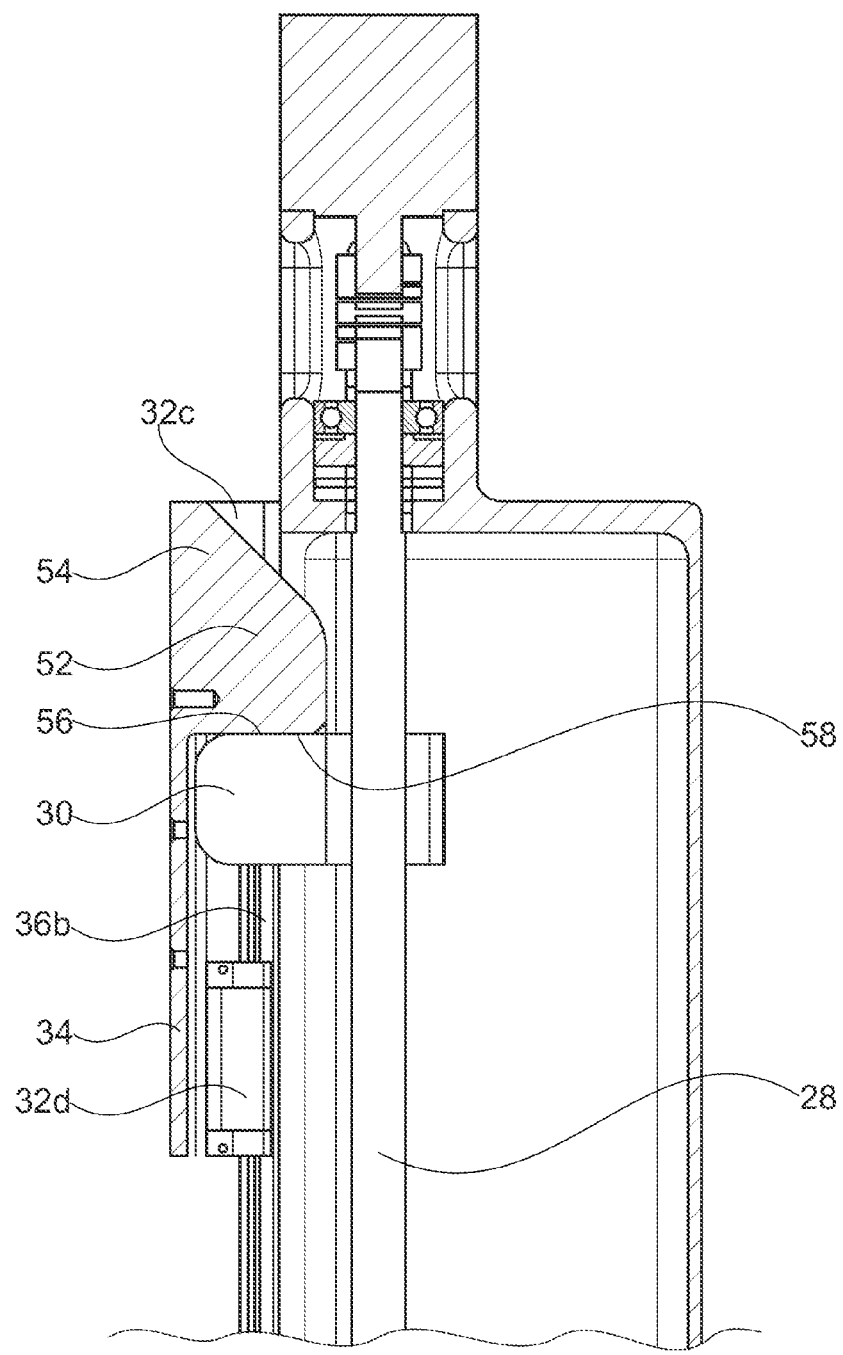
FIG. 4 shows a cross-sectional view of a middle portion of the lifting actuator assembly of FIG. 2.

As shown in FIG. 4, a carriage plate 34 rests on the floating nut 30 and is preferably connected to at least one carriage pad 32. At least one linear bearing rail 36a is supported on the body 24 and guides the carriage plate 34. Preferably, at least one carriage pad 32 is attached to the carriage plate 34. In a preferred embodiment, shown in FIG. 2, two linear bearing rails 36a, 36b are provided, with one located on either end of the body 24. The at least one anode 14 is mounted on the carriage plate 34 such that the motor 26 can drive the drive screw 28 to move the floating nut 30 axially within the body 24 to adjust a height of the at least one anode 14 with respect to the pot 6. In one embodiment the at least one anode 14 is mounted directly onto the carriage plate 34. One of ordinary skill in the art will recognize that a connection rod or other extending support could be used to mount the at least one anode 14 with the carriage plate 34 to allow for increased space between the lifting actuator assembly 22 and the pot 6. In one embodiment, four carriage pads 32a-32d are each positioned on a corner of the carriage plate 34 such that a first pair of the carriage pads 32a, 32b are guided on a first linear bearing rail 36a and a second pair of the carriage pads 32c, 32d are guided on a second linear bearing rail 36b.

As the anode 14 dissolves during the smelting process, the motor 26 drives the floating nut 30 downward, and the anode 14 can maintain a predetermined depth submerged within the solvent 10 in the pot 6. In one embodiment shown in FIG. 5, a plurality of anodes 14a, 14b are mounted to the carriage plate 34. Although two anodes 14a, 14b are shown mounted on the carriage plate 34 in FIG. 5, one of ordinary skill will recognize from the present disclosure that more than two anodes could be mounted to the carriage plate 34. In one embodiment, a plurality of lifting actuator assemblies 22 are provided, and the plurality of lifting actuator assemblies 42 are operated by a controller 44, shown schematically in FIG. 1, that is capable of individually adjusting each lifting actuator assembly 22 in the plurality of lifting actuator assemblies 42.

Figure 5:
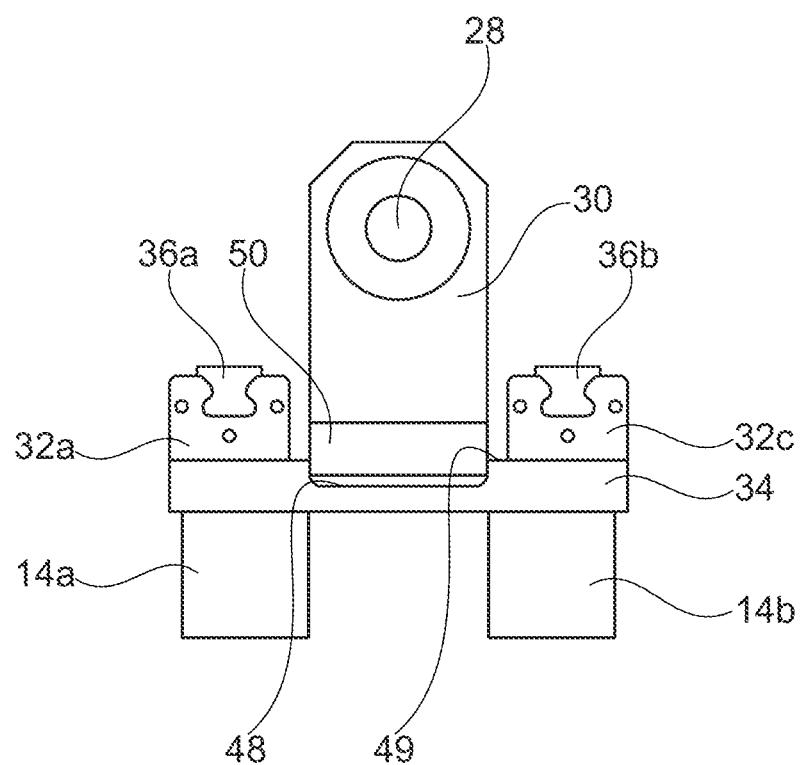
FIG. 5 shows a top view of a carriage plate and a floating nut for the lifting actuator assembly of FIG. 2.
Figure 6:
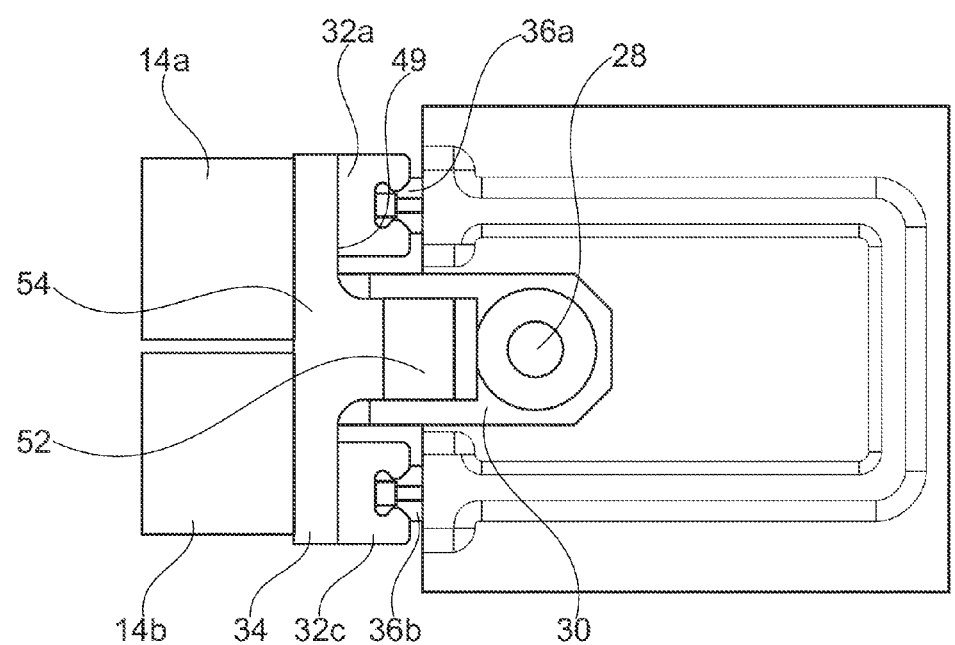
FIG. 6 shows another top view of the carriage plate and floating nut of FIG. 5.

As shown in FIG. 4, the carriage plate 34 includes a protrusion 52 on a longitudinal end 54 having an abutment surface 56 that engages an axial end 58 of the floating nut 30. The large mass of the anode 14 ensures the abutment surface 56 of the carriage plate 34 constantly rests against the axial end 58 of the floating nut 30 as the floating nut 30 moves axially up and down. As shown in FIG. 5, the carriage plate 34 includes a groove 48 on a surface 49 arranged facing the floating nut 30, and the floating nut 30 includes a projection 50 that is dimensioned to slide within the groove 48 of the carriage plate 34. In the embodiment shown in FIG. 5 the projection 50 extends along an entire side surface of the floating nut 30. In another embodiment, the projection 50 extends for a portion of a side surface of the floating nut 30. Due to both (1) the non-captive arrangement between the floating nut 30 and the carriage plate 34 and (2) the sliding support between the groove 48 and projection, the deflection and side loads typically experienced by a drive screw in similar lifting actuator assemblies is greatly reduced or eliminated. The arrangement of the groove 48 and projection 50 also allows for play with respect to the alignment of the drive screw 28 and the linear bearing rails 36a, 36b, which allows the lifting actuator assembly 22 to accommodate fluctuations in the load of the anode 14. FIG. 6 shows another view of the carriage plate 34 and floating nut 30, which is similar to FIG. 5, but shows a top planar view instead of a cross-sectional view as shown in FIG. 5. The longitudinal end 54 including the protrusion 52 of the carriage plate 34 is shown in FIG. 6.

In another embodiment, a lifting actuator assembly 22 for a smelting process is provided. The lifting actuator assembly 22 includes a motor 26 connected to a drive screw 28 located in a body 24 of the lifting actuator assembly 22, and the motor 26 rotates the drive screw 28. A floating nut 30 is connected to the drive screw 28 and a carriage plate 34 rests on the floating nut 30. The carriage plate 34 is connected to at least one carriage pad 32a and is configured to support at least one anode 14. The carriage plate 34 includes a protrusion 52 on a longitudinal end 54 having an abutment surface 56 that engages an axial end 58 of the floating nut 30. The carriage plate 34 includes a groove 48 on a surface 49 arranged facing the floating nut 30, and the floating nut 30 includes a projection 50 that slides within the groove 48 of the carriage plate 34. At least one linear bearing rail 36a is supported on the body 24 that guides the carriage plate 34, and the at least one anode 14 is mounted on the carriage plate 34 such that the motor 26 drives the floating nut 30 via the drive screw 28 axially within the body 24 to adjust a height of the at least one anode 14.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An assembly for smelting, the assembly comprising:
   a hopper adapted to contain raw smelting material;
   a pot including an opening in connection with the hopper, the pot containing a solvent and having a coated inner surface;
   at least one anode including a first end supported outside the pot and a second end partially submerged in the solvent in the pot;
   an electrical conductor contacting the first end of the at least one anode;
   a lifting actuator assembly including a body supported adjacent to the pot, a motor connected to a drive screw located in the body, the motor rotates the drive screw, a floating nut connected to the drive screw, a carriage plate rests on the floating nut and is connected to two linear bearing rails supported on the body that guides the carriage plate, the at least one anode is mounted on the carriage plate such that the motor drives the floating nut axially within the body to adjust a height of the at least one anode with respect to the pot; and
   four carriage pads each connected to the carriage plate, and a first pair of the four carriage pads is supported on a first one of the two linear bearing rails and a second pair of the four carriage pads is supported on a second one of the two linear bearing rails.

2. The assembly of claim 1, wherein the carriage plate includes a protrusion on a longitudinal end having an abutment surface that engages an axial end of the floating nut.

3. The assembly of claim 1, wherein the carriage plate includes a groove on a surface arranged facing the floating nut, and the floating nut includes a projection that slides within the groove of the carriage plate.

4. The assembly of claim 1, wherein a plurality of anodes are mounted to the carriage plate.

5. The assembly of claim 1, wherein the drive screw comprises a differential roller screw.

6. The assembly of claim 1, wherein the body includes a support bearing for the drive screw.

\* \* \* \* \*